United States Patent Office 3,322,404
Patented May 30, 1967

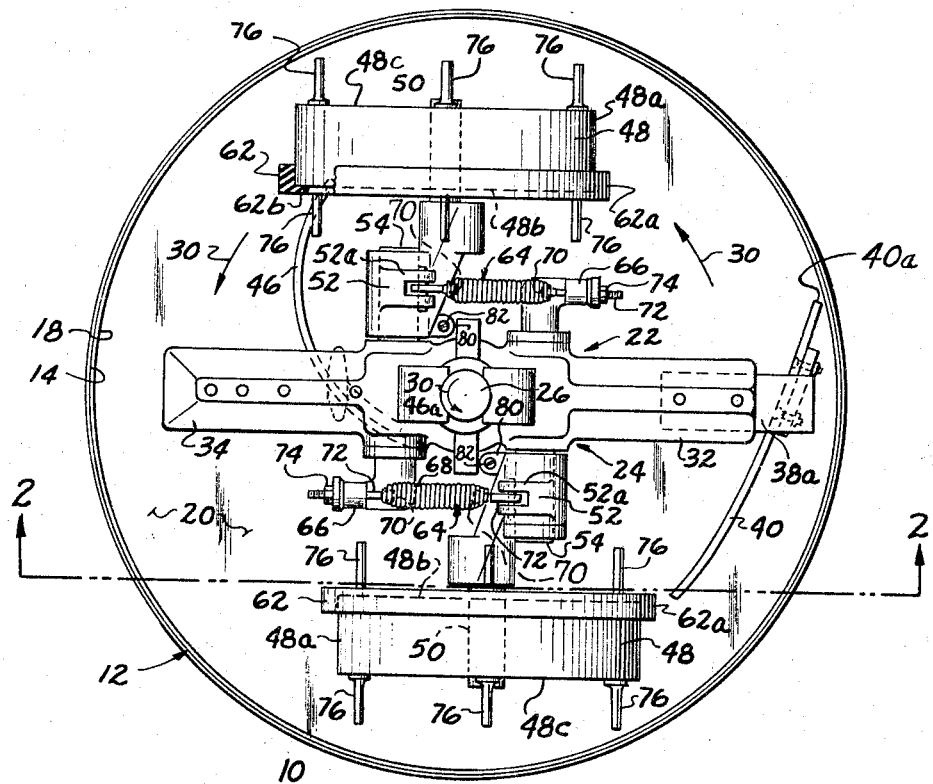

3,322,404
MIXER INCLUDING MULLING WHEEL WITH RESILIENT TIRE MEANS TO FACILITATE WHEEL ROTATION
Robert L. McIlvaine, Winnetka, Ill., assignor, by mesne assignments, to National Engineering Company, Chicago, Ill., a corporation of Delaware
Filed Apr. 22, 1965, Ser. No. 450,029
8 Claims. (Cl. 259—112)

The present invention relates to mixers generally and, more particularly, to mixers of the type employing large mulling wheels and plows for pulverizing and mixing relatively large quantities of material, such as foundary sand and the like.

When preparing foundary sand for use in molding operations, a quantity of relatively dry material is first introduced into the mixer and then various materials, such as bonding agents and water, are added to the mixture to finally produce a pasty, plastic, homogeneous mass of material suitable for molding purposes. During the mixing process, the material goes through various stages, starting from a relatively dry condition and then becoming a semi-liquid or wet, slurry-type mixture and finally ending up in a pasty or plastic condition suitable for use in molding flasks. Prior art mixers perform efficient mulling and mixing action when the material is in a dry or plastic condition but tend to become inefficient when the material reaches the wet-slurry or semi-liquid state.

When the material becomes wet and sloppy there is not enough frictional force acting between the mixture and the mulling surfaces of the mulling wheels to cause the wheels to rotate, and consequently the wheels tend to stall or rotate very slowly. As this occurs, the mixing and mulling action becomes more inefficient, since very little mulling action or agitation is effected by the mulling wheels and the plows alone continue to mix and agitate the material.

Accordingly, it is an object of the present invention to provide a new and improved mixer which will efficiently and continuously pulverize and mix material, even though the material undergoes various changes in condition, ranging from a dry mix through a slurry or wet-sloppy condition to a final pasty or plastic condition.

Another object of the present invention is the provision of a new and improved mixer which will efficiently and continuously pulverize and aerate material in a wet-slurry or sloppy condition with substantialy the same effectiveness as when the material is in a dry or plastic condition.

Another object of the present invention is the provision of a new and improved mixer of the type employing mulling wheels with large peripheral mulling surfaces thereon for pulverizing and keeping the material and including means for insuring the continuous rotation of the wheels even though the material being mixed becomes sloppy and wet.

Yet another object of the present invention is the provision of a new and improved mixer of the type employing mulling wheels with large peripheral mulling surfaces thereon and including frictional means selectively engageable between the wheels and mixing chamber for insuring the continuous rotation of the wheels even though the frictional forces between the material and wheel mulling surfaces are not sufficient to rotate the wheels independently.

Still another object of the present invention is the provision of a new and improved mixer of the type described having means associated with the wheels for continuously aerating the material during wheel rotation.

Yet another object of the present invention is the provision of a new and improved mixer of the type described having resilient, frictional, outer driving tires on the mulling wheels thereof for rotating the wheels during periods of low frictional forces between the mulling surfaces of the wheels and the material, and additionally including adjustable resilient biasing means for urging the wheels downwardly with selectively adjustable forces to provide frictional driving force between the tires of the wheels and mixing chamber bottom, causing continuous rotation of the wheels regardless of the condition of the material being treated.

Yet another object of the present invention is the provision of a new and improved mixer of the type described, including resilient, frictional, driving tires on the mulling wheels thereof and including new and improved means for maintaining the tires in the proper position on the wheels against forces tending to cause the tires to move outwardly on the wheels during rotation of the mixing head assembly in the chamber.

Briefly, the foregoing and other objects of the present invention are accomplished by the provision of a new and improved mixer comprising a mixing chamber having a bottom wall and a mixing head assembly mounted for rotation in said chamber about a central axis. At least one mulling wheel is carried by the mixing head and is mounted for free rotation on an axle extending outwardly of the central axis and movable toward and away from the bottom wall of the chamber. The mulling wheel includes an enlarged peripheral mulling surface encircling the axle to provide an enlarged arcuate portion thereof which is in continual facing relation with the bottom wall of the mixing chamber for mulling contact with the material. The mulling wheel includes an inner face intersecting the peripheral mulling surface and an outer face spaced outwardly thereof. Resilient tire means are provided on the wheel to encircle a portion of the mulling surface thereof, and the tire means include an outer tractive surface which is selectively engageable with the bottom wall of the chamber to rotate the mulling wheel about its mounting axle when the mixing head is in rotation about the chamber. When the frictional force between the mulling surface and the material is not sufficient to rotate the wheel independently, the tractive surface of the tire means engages the bottom wall of the chamber and causes the wheel to continue in rotation. The tire means preferably is formed with a lip extending inwardly toward the axle and bearing against the inner face of the wheel to prevent the tire means from creeping outwardly on the wheel toward said outer face.

A plurality of aerating cleats are mounted on the wheel to extend outwardly from the respective side faces thereof for movement into and out of contact with the material as the wheel rotates, causing continuous agitation and the aeration thereof. Adjustable biasing means are provided for resiliently urging the wheel and tire means downwardly toward the bottom wall of the chamber so that when the material becomes sloppy or wet and the frictional force between the mulling surface of the wheel and the material is not sufficient to rotate the wheel, the tire means will frictionally engage the bottom wall of the chamber, causing the wheel to continue in rotation.

For a better understanding of the present invention, reference should be had to the following detailed description taken in conjunction with the drawings, on which:

FIG. 1 is a top plan view of a new and improved mixer constructed in accordance with the features of the present invention;

FIG. 2 is a sectional view taken substantially along lines 2—2 of FIG. 1, illustrating one operative position of the mulling wheels of the mixer;

Figure 3:
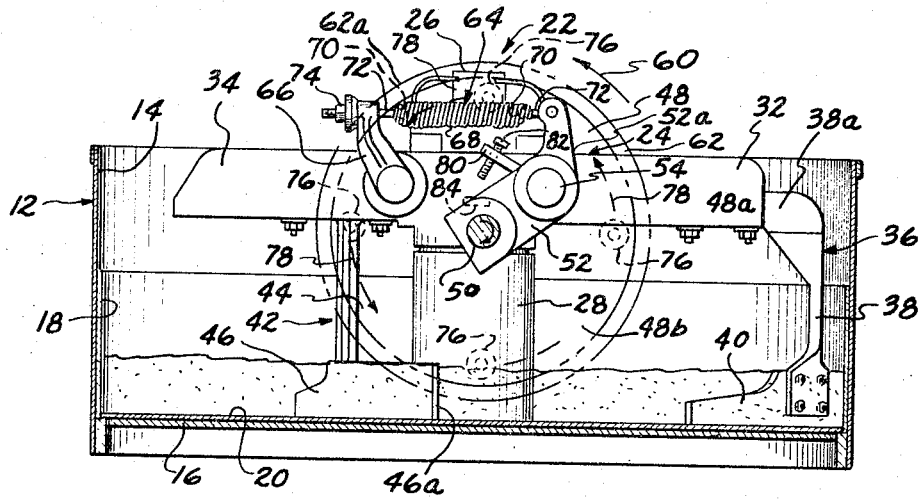
FIG. 3 is a sectional view similar to FIG. 2 but illustrating the mulling wheels in another operative position.
Figure 4:
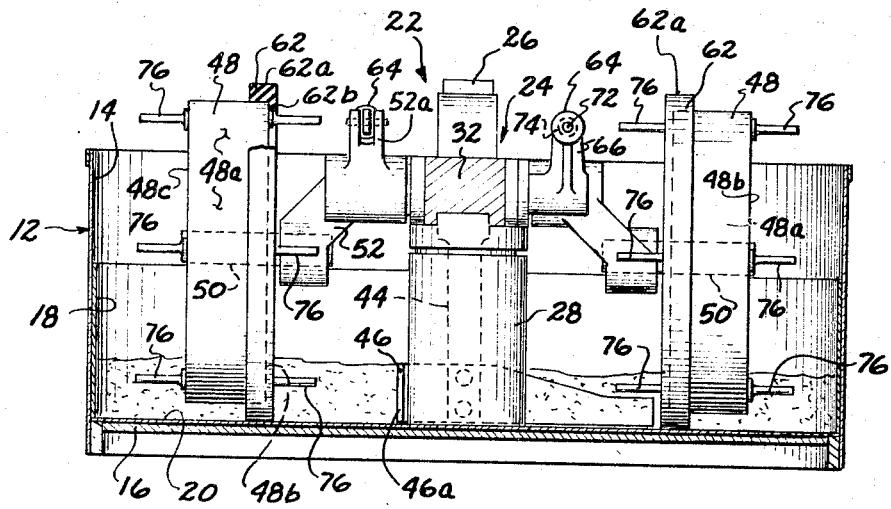
FIG. 4 is a sectional view taken substantially along lines 4—4 of FIG. 2.

Referring now, more specifically, to the drawings, therein is illustrated a mixer 10 constructed in accordance with the features of the present invention. The mixer 10 includes a material-containing crib or mixing chamber 12 having an upstanding cylindrical sidewall 14 and a circular bottom wall or baseplate 16. The inner face of the lower portion of the sidewall is covered with a replaceable wall liner 18, and a replaceable bottom wear plate 20 is mounted on the upper surface of the baseplate 16. The wall liner 18 and wear plate 20 can be replaced from time to time as wear occurs from the mixing of abrasive materials.

Within the mixing chamber 12 there is provided a rotating mixing head assembly referred to generally by the numeral 22. The mixing head assembly includes a centrally located turrethead 24 supported on a vertical drive shaft 26 which is centrally located within the mixing chamber. The shaft 26 is supported for rotation within a centrally disposed, fixed enclosure 28 which extends upwardly from the wear plate 20 and baseplate 16. The shaft 26 extends downwardly through the wear plate and bottom wall and is drivingly connected to a power source, such as a gear reducer and drive motor (not shown) located beneath the mixing chamber. As illustrated in FIG. 1, the shaft 26 is aligned with the vertical central axis of the mixing chamber 12 and is driven to rotate in a counterclockwise direction, as indicated by the arrows 30.

The turrethead 24 includes a pair of diametrically opposite, radially outwardly extending plow support arms 32 and 34. The support arm 32 carries an outer plow assembly 36 which comprises a vertically extending support post 38 having an upper end portion 38a extending horizontally inward and secured to the underside of the support arm 32. The lower end of the post 38 is bolted to an outer plow or scraper 40 having a lower edge positioned to move in close proximity to the upper surface of the wear plate 20. The outer plow 40 includes an upstanding outer edge 40a positioned to move in close proximity to the inner surface of the wall liner 18, and the plow 40 is arranged to extend inwardly from the edge 40a (FIG. 1) in order to direct material adjacent the periphery of the mixing chamber inwardly towards the central portion thereof.

The support arm 34 carries an inner plow assembly 42 which comprises a vertically extending plow support post 44 having its upper end secured to the underside of the plow support arm. An inner scraper or plow 46 is bolted to the lower end of the post 44 and includes a lower edge disposed to move in close proximity to the upper surface of the wear plate 20. The inner plow 46 has an upstanding vertical inner edge 46a arranged to move in close proximity to the central fixed enclosure 28. The inner plow 46 extends outwardly from the inner edge 46a (FIG. 1) in order to move material adjacent the central portion of the mixing chamber 12 outwardly as the mixing head assembly 22 is rotated.

The mixing head assembly 22 also includes a pair of large, generally cylindrical mulling wheels 48 disposed on opposite sides of the turrethead 24 and on opposite sides of the plow support arms 32 and 34, as illustrated in FIG. 1. The mulling wheels are heavily constructed of material such as iron or steel so that their heavy weight will aid in pulverizing and grinding the material contained within the crib or mixing chamber 12 as the wheels move around. Each of the mulling wheels 48 is formed with an enlarged, cylindrical, outer peripheral mulling surface 48a for mulling engagement with the material in the crib to force the material downwardly against the upper surface of the wear plate 20 in a mulling or kneading-type action as the wheels move and rotate on their axles. An arcuate segment or portion of each of the mulling surfaces 48a is always in direct confronting relation with the wear plate 20 as the wheels rotate during movement of the mixing head assembly around the chamber, and accordingly a relatively large segment or area of mulling surface is in continuous mulling engagement with the material.

Each mulling wheel 48 is formed with an inner side face 48b and an outer side face 48c and is journaled for free rotation on a supporting axle 50 which extends outwardly from a wheel support member 52. The support members 52 are mounted on opposite sides of the turrethead 24 and are rotatable on supporting pins or axles 54 which extend horizontally outward from opposite sides of the turrethead.

Referring to FIG. 2, it can be seen that when the respective wheel support members 52 pivot about their respective mounting axles 54 in the direction indicated by the arrows 56 and 58, the wheels 48 and, consequently, the mulling surfaces 48a move toward and away from the upper surface of the wear plate 20. As the mixing head assembly 22 rotates in the mixing chamber, frictional engagement between the material and the mulling wheels causes the wheels to rotate about their respective axles 50, as indicated by the arrow 60. As the mulling wheels 48 rotate about their respective axles 50 and move around the mixing chamber 12 in response to rotation of the mixing head assembly 22, material in the chamber is pulverized and the lumps therein are broken down by the intense mulling action between the mulling surfaces 48a and the upper surface of the wear plate 20.

When the material is relatively stiff or hard, the mulling wheels tend to float or ride upwardly in the direction of the arrow 56 to a position as shown in FIG. 3, as the mixing head assembly rotates and the frictional force between the material and the wheels is sufficiently large to cause the wheels to rotate freely around their respective mounting axles 50. However, when the material undergoes a change to a less viscous and sloppy or wet condition, the frictional force between the material and the wheels is not great enough to rotate the mulling wheels about their mounting axles, and the wheels tend to stall or rotate at a much slower rate, greatly reducing the mixing and pulverizing action.

In order to provide for the continuous rotation of the mulling wheels, even though the material is wet and sloppy, each wheel is provided with a resilient traction tire 62 constructed of rubber or similar material. The tires 62 are formed with a cylindrical outer traction surface 62a for engagement with the upper surface of the wear plate 20. As illustrated in FIG. 2, when the material is wet and sloppy there is very little force, tending to cause the wheels to ride or float upwardly on the bed of material, and the wheels move downwardly in the direction of the arrow 58 until the tractive surfaces 62a of the tires encounter the upper surface of the wear plate 20. When the tractive surfaces 62a engage the wear plate, the mulling wheels are rotated on their mounting axles 50 even through the material is wet and sloppy and has a decreased viscosity which is not sufficient to rotate the wheels. Each of the tires 62 is provided with an integral, inwardly extending lip portion 62b which bears against the inner side face 48b of a respective mulling wheel, and the lip prevents the tire from moving outwardly on the wheel because of outwardly directed force components acting on the tire when the mixing head rotates and the tire is in tractive engagement with the wear plate.

As the material in the mixing chamber 12 changes from a wet, sloppy, or slurry condition to the pasty or plastic state, the frictional force between the mulling wheels and the material begins to increase and becomes sufficient to again rotate the wheels independently. As this occurs, the wheels also tend to ride upwardly or float on the bed of material, and the traction surfaces 62a of the tires 62 move upwardly and no longer engage with the wear plate 20. The traction tires 62 thus provide for continuous rotation of the mulling wheels 48, even though the material being treated undergoes changes in viscosity, density, and flowability.

In order to selectively adjust a degree of mulling pressure between the mulling wheels and the material and also the traction pressure between the tires 62 and the wear plate 20, the wheel support members 52 are provided with upstanding actuating arms 52a. The arms 52a are connected to the ends of respective spring biasing assemblies 64. The opposite ends of the biasing assemblies 64 are adjustably connected to respective fixed, upstanding arms 66 which are secured to opposite sides of the turrethead 24. Each spring assembly 64 includes a coiled tension spring 68 having end coils tapering to a reduced diameter for bearing against conically shaped stop members 70 enclosed within the springs and mounted on the inner ends of a pair of outwardly extending tension rods 72. The outer ends of the pair of rods 72 in each spring assembly 64 are connected to one of the actuating arms 52a and an opposed fixed arm 66, and the rods connected to the fixed arms are threaded adjacent their outer ends to receive adjusting nuts 74 which can be tightened or loosened to select the desired amount of tension on the springs 68. Accordingly, if the nuts 74 are tightened, tension on the springs 68 is increased and the mulling wheels 48 are biased downwardly toward the wear plate 20 with a greater force, and if the nuts 74 are loosened, the downward biasing force on the mulling wheels is reduced. By providing the proper amount of tension on each spring assembly 64, the desired amount of mulling pressure and tractional pressure can be selected.

In order to limit the downward movement of the mulling wheels 48 toward the wear plate 20 and thereby eliminate overpressures on the tires 62 which could cause excessive wear during operation, the turrethead 24 includes a pair of outwardly extending, fixed stops or ears 84 formed on opposite sides thereof. Each wheel support member 52 includes a short stop arm 80 extending outwardly from the sleeve portion thereof adapted to overlie one of the respective fixed stops on the turrethead. The arms 80 are provided with threaded bores to receive adjustable stop pins or bolts 82 which extend downwardly therethrough for contact with the ears 84 to limit the downward travel of the mulling wheels. By tightening or loosening the stop bolts 82 in their respective arms, the mulling pressures and tractive pressures between the wheel tires and wear plate can be limited and adjusted as desired.

In order to provide mixing and aeration of the material in the mixing chamber in addition to that provided by the plows, each of the mulling wheels 48 is provided with a plurality of aerating cleats or spokes 76. The cleats 76 are mounted to extend outwardly from the respective inner and outer side faces 48b and 48c of the mulling wheels and are positioned in a circular pattern at locations spaced inwardly from the outer mulling surfaces 48a toward the respective axles of the wheels. As the mulling wheels 48 rotate about their respective axles, the cleats 76 move downwardly into the material in a sort of digging action and then move upwardly, carrying along some of the material for further aeration as it sifts downwardly from the cleats back into the material bed. The cleats 76 add to the efficiency of the mixer and aid in drying the material by entraining quantities of air in the material, and, in addition, the cleats aid in rotating the wheels about their respective axles. When the material is in a sloppy or wet-slurry condition, mulling action is not as important because of the reduced viscosity of the material, but continuous aeration and mixing action by the cleats is advantageous in aiding to reduce the period of time required for the material to change from the sloppy or wet condition to the semi-plastic or pasty condition.

As the mixing head assembly 22 is rotated, the plows 40 and 46 continuously move and mix the material and turn it over. The outer plow 40 moves the material adjacent the periphery of the mixing chamber 12 inwardly into the path traversed by the mulling wheels 48, and the inner plow 46 moves the material in the central portion of the mixer outwardly into the path traversed by the mulling wheels. The continuously rotating wheels provide highly efficient mulling, aeration, and agitation of material as it undergoes changes from a relatively dry or hard phase through a wet, sloppy phase and finally reaches a plastic or pasty condition. The traction tires 62 insure that the mulling wheels 48 are continuously rotated, providing for maximum efficiency in agitating, aerating, and mixing the material even though it may be in a wet-slurry or sloppy phase.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed and desired to be secured by Letters Patent of the United States is:

1. Apparatus for conditioning material, said apparatus comprising a mixing chamber having a bottom wall, a mixing head mounted for rotation in said chamber about a central axis, at least one mulling wheel outwardly of said axis carried by said head for free rotation on an axle movable toward and away from said bottom wall, said mulling wheel including an outer peripheral mulling surface encircling said axle and having an arcuate portion thereof in continuous facing relation with said bottom wall for mulling contact with material in said chamber and resilient tire means encircling a portion of said mulling surface and having an outer tractive surface engageable with said bottom wall to rotate said wheel about said axle when said mixing head is rotated.

2. Apparatus as defined in claim 1 including means for maintaining said tire means on said wheel and preventing said tire means from moving outwardly on said wheel as said mixing head rotates around said chamber.

3. Apparatus as defined in claim 1 wherein said mulling wheel includes an inner side face and an outer side face, both intersecting said mulling surface at their peripheries, and a plurality of aerating cleats extending outwardly from said respective side faces at spaced locations inwardly of said mulling surface toward said axle.

4. Apparatus as defined in claim 1 including adjustable biasing means for resiliently biasing said wheel and tire means downwardly into frictional engagement with said bottom wall at selectively adjustable pressures between said bottom wall and said tire means.

5. Apparatus for conditioning material, said apparatus comprising a mixing chamber having a bottom wall, a mixing head assembly mounted for rotation in said chamber about a central axis, at least one mulling wheel carried by said head for free rotation on an axle extending outwardly of said central axis and movable toward and away from said bottom wall, said mulling wheel including a peripheral mulling surface encircling said axle with an arcuate portion thereof facing in continuous relation with said bottom wall for mulling contact with the material in said chamber, said wheel including an inner face intersecting said mulling surface and facing said head assembly and an outer face spaced outwardly thereof, resilient tire means encircling a portion of said mulling surface adjacent said inner face, said tire means including an outer tractive surface engageable with said bottom wall to rotate said wheel about said axle upon rotation of said mixing head, and lip means on said tire means extending inwardly toward said axle and bearing against the inner face of said wheel preventing said tire means from moving outwardly on said wheel toward said outer face.

6. Apparatus for conditioning material, said apparatus comprising a mixing chamber having a bottom wall, a mixing head assembly mounted for rotation in said chamber about a central axis, at least one mulling wheel carried by said head for free rotation on an axle extending outwardly of said central axis and movable toward and away from said bottom wall, said mulling wheel including a peripheral mulling surface encircling said axle with an arcuate portion thereof facing in continuous relation with said bottom wall for mulling contact with the material in said chamber, said wheel including an inner face intersecting said mulling surface and facing said head assembly and an outer face spaced outwardly thereof, a plurality of aerating cleats extending inwardly from said inner face toward said head assembly and a plurality of aerating cleats extending outwardly of said outer face away from said head assembly, said cleats positioned at spaced locations about said wheel intermediate of said axle and said peripheral mulling surface, resilient tire means encircling a portion of said mulling surface adjacent said inner face, said tire means including an outer tractive surface engageable with said bottom wall to rotate said wheel about said axle upon rotation of said mixing head, and lip means on said tire means extending inwardly toward said axle and bearing against the inner face of said wheel preventing said tire means from moving outwardly on said wheel toward said outer face.

7. Apparatus as defined in claim 6 including a wheel support member carrying said axle and mounted for rotation about a horizontal axis extending outwardly from said head assembly toward said sidewall, said support member including an upstanding actuating arm, and spring means having one end connected to said arm and another end connected to said head assembly for biasing said wheel and tire downwardly into frictional engagement with said bottom wall at selectively adjustable pressures.

8. Apparatus as defined in claim 7 including adjustable stop means for limiting the downward movement of said wheel and tire toward said bottom wall.

References Cited
UNITED STATES PATENTS

| | | | |
|---|---|---|---|
| 2,570,223 | 10/1951 | Everett et al. | 22—89 |
| 3,223,335 | 12/1965 | Jacobs | 241—109 |
| 3,248,761 | 5/1966 | McIlvaine | 22—89 |
| 3,256,573 | 6/1966 | Hunter | 241—110 |

J. SPENCER OVERHOLSER, *Primary Examiner.*

R. D. BALDWIN, *Assistant Examiner.*